(12) United States Patent
Zhou et al.

(10) Patent No.: US 8,951,313 B2
(45) Date of Patent: Feb. 10, 2015

(54) GASIFIER COOLING SYSTEM WITH CONVECTIVE SYNGAS COOLER AND QUENCH CHAMBER

(75) Inventors: Qiong Zhou, Houston, TX (US); Wei Chen, Sugar Land, TX (US); Thomas Glen Cobb, Katy, TX (US); Jennifer Lucia Ramirez, Houston, TX (US); Hsien-Chin William Yen, Sugar Land, TX (US)

(73) Assignee: General Electric Company, Schenectady, NY (US)

( * ) Notice: Subject to any disclaimer, the term of this patent is extended or adjusted under 35 U.S.C. 154(b) by 490 days.

(21) Appl. No.: 13/432,026

(22) Filed: Mar. 28, 2012

(65) Prior Publication Data

US 2013/0255916 A1 Oct. 3, 2013

(51) Int. Cl.
C10J 3/82 (2006.01)
C10J 3/86 (2006.01)

(52) U.S. Cl.
USPC .............. 48/61; 48/197 R; 423/644

(58) Field of Classification Search
USPC .............................. 48/61; 423/644
See application file for complete search history.

(56) References Cited

U.S. PATENT DOCUMENTS

| | | | |
|---|---|---|---|
| 4,270,493 A | 6/1981 | Blaskowski | |
| 4,377,394 A * | 3/1983 | Muenger et al. | 48/62 R |
| 4,436,530 A * | 3/1984 | Child et al. | 48/197 R |
| 4,602,677 A | 7/1986 | Forster et al. | |
| 4,885,126 A | 12/1989 | Polonio | |
| 4,891,157 A | 1/1990 | dePaz et al. | |
| 4,959,078 A | 9/1990 | Ziegler | |
| 5,065,282 A | 11/1991 | Polonio | |
| 5,145,534 A | 9/1992 | Weedaeghe et al. | |
| 5,415,673 A | 5/1995 | Hilton et al. | |
| 5,752,467 A | 5/1998 | Lamon | |
| 5,976,601 A | 11/1999 | Tesvich et al. | |
| 6,051,195 A | 4/2000 | Deeke et al. | |
| 2007/0119577 A1 | 5/2007 | Kraft et al. | |
| 2008/0175770 A1 * | 7/2008 | Wallace | 422/201 |
| 2009/0199474 A1 | 8/2009 | Leininger et al. | |
| 2009/0202717 A1 | 8/2009 | Morra et al. | |
| 2010/0278702 A1 | 11/2010 | Leininger et al. | |
| 2011/0016788 A1 | 1/2011 | Thacker et al. | |
| 2011/0036096 A1 | 2/2011 | Bommareddy et al. | |
| 2011/0076116 A1 | 3/2011 | Liu et al. | |
| 2011/0120010 A1 | 5/2011 | Tiwari et al. | |
| 2011/0186589 A1 | 8/2011 | Kaiin et al. | |
| 2011/0260113 A1 | 10/2011 | Anand et al. | |
| 2012/0005959 A1 | 1/2012 | Chen et al. | |

* cited by examiner

*Primary Examiner* — Matthew Merkling
(74) *Attorney, Agent, or Firm* — Sutherland Asbill & Brennan LLP

(57) ABSTRACT

The present application thus provides a gasifier cooling system for cooling a flow of hot syngas from a gasifier. The gasifier cooling system may include a radiant syngas cooler, a quench chamber, and a convective syngas cooler such that the flow of syngas flows through the quench chamber or the convective syngas cooler.

17 Claims, 3 Drawing Sheets

US 8,951,313 B2

GASIFIER COOLING SYSTEM WITH CONVECTIVE SYNGAS COOLER AND QUENCH CHAMBER

TECHNICAL FIELD

The present application and the resultant patent relate generally to integrated gasification combined cycle power plants and more particularly relate to a gasifier cooling system with a combination of both a convective syngas cooler and a quench chamber so as to improve overall gasifier and power plant reliability and performance.

BACKGROUND OF THE INVENTION

Integrated gasification combined cycle ("IGCC") power plants are capable of generating energy from various types of hydrocarbon feed stocks in a relatively clean and efficient manner. IGCC technology may convert the hydrocarbon feed stock into a gaseous mixture of carbon monoxide and hydrogen, i.e., a synthetic gas or a syngas, by reaction with oxygen and steam in a gasifier. These gases then may be cleaned, processed, and utilized as a fuel in a gas turbine engine in a conventional combined cycle power plant and the like.

In processing the flow of hot, dirty syngas leaving the gasifier, the flow first may be cooled. For example, a convective syngas cooler may be used downstream of the gasifier. The convective syngas cooler has the advantage of being able to circulate a cooling medium to exchange heat with the hot syngas such that the cooling medium may be used to provide useful work in a steam turbine and the like. The solids entrained in the flow of the dirty syngas, however, have a tendency to plug the convective syngas cooler such that efficiency may suffer and downtime may be required. Another alternative to cool the syngas is to use a direct quench chamber instead of a convective syngas cooler. The use of the direct quench cooler avoids the plugging issue and thus may increase overall plant availability. The useful work produced by the cooling medium in the convective syngas cooler, however, is lost such that overall plant performance may be decreased.

There is thus a desire for an improved gasifier and cooling system for use in an IGCC power plant and the like. Preferably such an improved gasifier cooling system may adequately cool the flow of the hot, dirty syngas without efficiency loses and downtime caused by solids plugging a convective syngas cooler and while retaining overall plant performance and efficiency.

SUMMARY OF THE INVENTION

The present application and the resultant patent thus provide a gasifier cooling system for cooling a flow of hot syngas from a gasifier. The gasifier cooling system may include a radiant syngas cooler, a quench chamber, and a convective syngas cooler such that the flow of syngas flows through the quench chamber or the convective syngas cooler.

The present application and the resultant patent further provide a method of cooling a flow of syngas from a gasifier. The method may include the steps of flowing the syngas through a radiant syngas cooler, flowing the syngas through a convective syngas cooler, sensing a blockage in the convective syngas cooler, and routing the syngas through a quench chamber.

The present application and the resultant patent further provide a gasifier cooling system for cooling a flow of hot syngas from a gasifier. The gasifier cooling system may include a radiant syngas cooler, a quench chamber positioned about the radiant syngas cooler, one or more convective syngas coolers, and one or more convective syngas cooler conduits connecting the radiant syngas cooler and the one or more convective syngas coolers such that the flow of syngas flows through the quench chamber or the convective syngas coolers.

These and other features and advantages of the present application and the resultant patent will become apparent to one of ordinary skill in the art upon review of the following detailed description when taken in conjunction with the several drawings and the appended claims.

DETAILED DESCRIPTION

Figure 1:
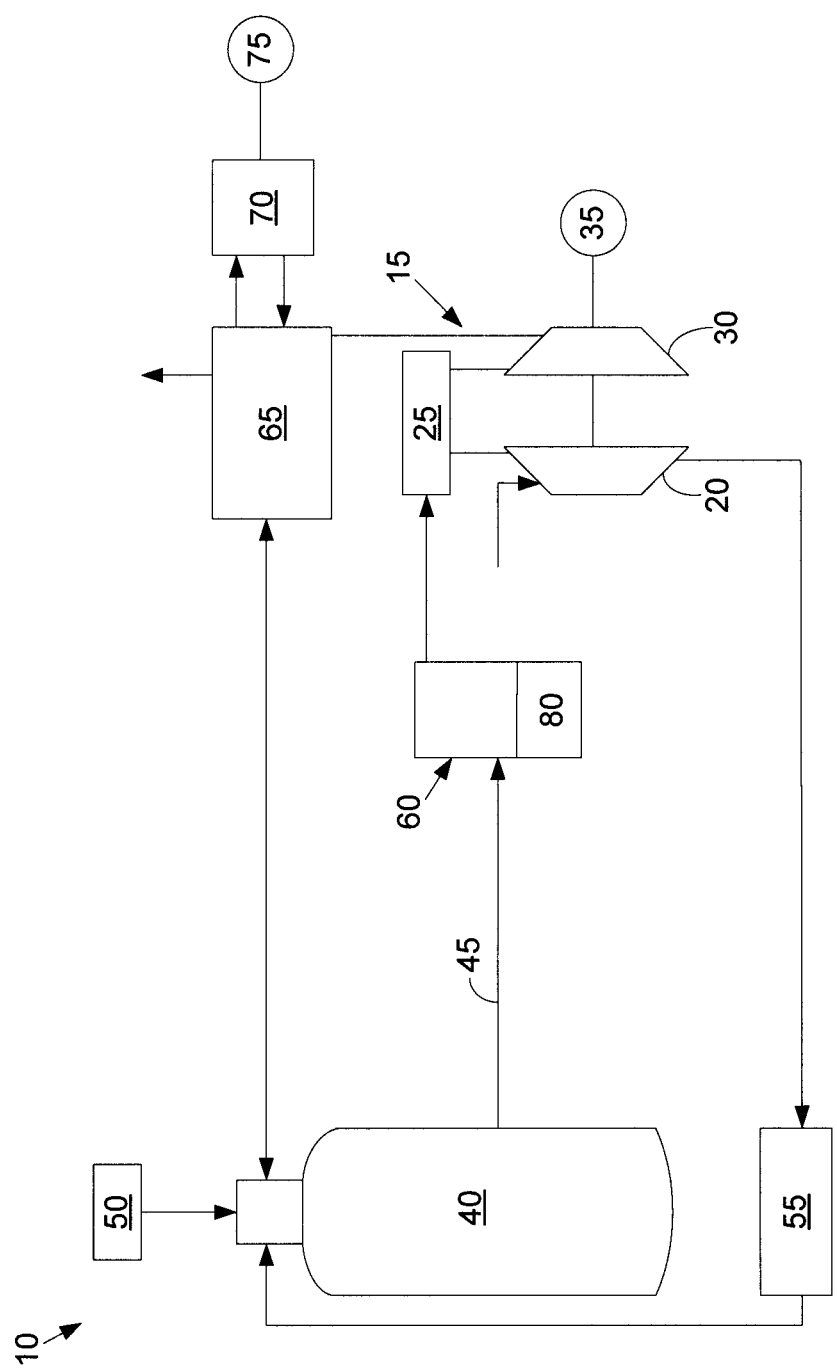
FIG. 1 is a schematic diagram of an example of an integrated gasification combined cycle power plant.
Figure 2:
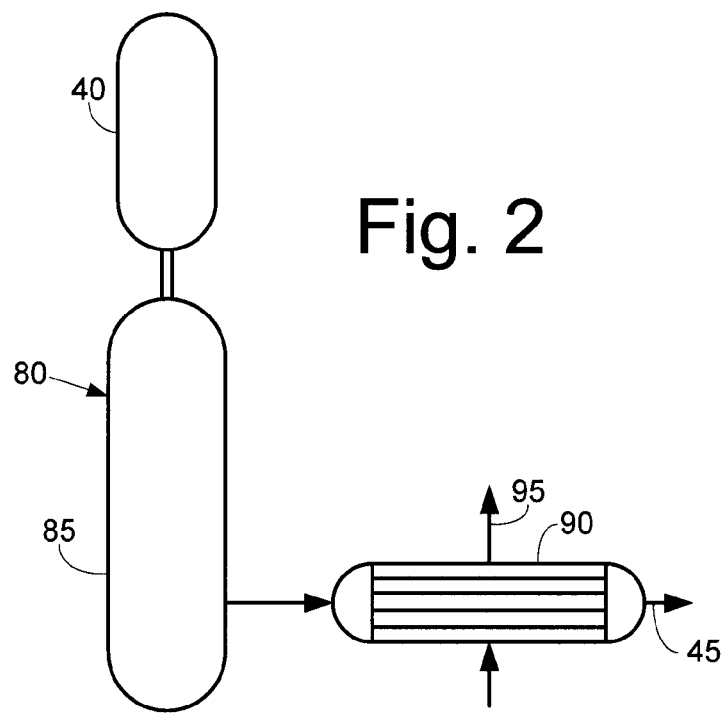
FIG. 2 is a schematic diagram of a gasifier for use with an integrated gasification combined cycle power plant with a radiant syngas cooler and a convective syngas cooler.

Referring now to the drawings, in which like numerals refer to like elements throughout the several views, FIG. 1 shows a schematic diagram of an example of an integrated gasification combined cycle ("IGCC") power plant 10. Only a high level description of the components of the IGCC power plant 10 related to the subject matter described herein is shown for purposes of simplification. One of ordinary skill in the art will understand that the overall IGCC power plant 10 may have many other configurations and may use many other types of components. Other types of power plants may be used herein.

The IGCC power plant 10 may include one or more gas turbine engines 15. Generally described, the gas turbine engine 15 may include a compressor 20. The compressor 20 compresses an incoming flow of air. The compressor 20 delivers the compressed flow of air to a combustor 25. The combustor 25 mixes the compressed flow of air with a pressurized flow of fuel and ignites the mixture to create a flow of hot combustion gases. Although only a single combustor 25 is shown, the gas turbine engine 15 may include any number of the combustors 25. The flow of hot combustion gases is in turn delivered to a turbine 30. The flow of hot combustion gases drives the turbine 30 so as to produce mechanical work. The mechanical work produced in the turbine 30 drives the compressor 20 and an external load 35 such as an electrical generator and the like.

The gas turbine engine 15 may use natural gas, various types of syngas, combinations thereof, and other types of fuels. If syngas is used, the IGCC power plant 10 may use a gasifier 40 to produce a flow of syngas 45 from various types of feedstock materials 50. The feedstock materials 50 may include coal, petroleum coke, biomass, wood based materials, agriculture wastes, tars, coke oven gas, asphalt, and other types of carbon containing materials. As described above, the gasifier 40 may mix the feedstock materials 50 with a flow of oxygen. The gasifier 40 may generate the syngas 45 via a pyroloysis process, a combustion process, and similar types of techniques. The gasifier 40 may receive the flow of oxygen from an air separation unit 55 or a similar type of device. The air separation unit 55 may receive an air extraction from the compressor 20 or other source. Other types of gasification techniques and other sources of the feedstock materials 50 may be used herein.

The hot, dirty syngas 45 from the gasifier 40 may be sent to a gas cleaning unit 60 and the like. The gas cleaning unit 60 may clean the impurities in the flow of syngas 45 via a number of techniques. The syngas 45 then may be forwarded to the combustor 25 of the gas turbine engine 15 for combustion in a manner similar to that described above or otherwise. The hot combustion gases produced in the gas turbine engine 15 may be forwarded to a heat recovery steam generator 65. The heat recovery steam generator 65 may exchange heat with the flow of combustion gases to create steam to drive a steam turbine and the like. The steam turbine 70 may drive the load 35 or any type of a second load 75. Other components and other configurations may be used herein.

The IGCC power plant 10 also may include a syngas cooling unit 80. The syngas cooling unit 80 serves to cool the flow of the hot, dirty syngas 45 in connection with the gas cleaning unit 60. The syngas cooling unit 80 may have a radiant syngas cooler 85 to receive the flow of syngas 45 produced in the gasifier 40. The flow of syngas 45 then may be cooled further in a convective syngas cooler 90. The convective syngas cooler 90 may be a conventional heat exchanger such as a tube and shell heat exchanger and the like. The convective syngas cooler 90 may exchange heat with the flow of syngas 45 and a cooling medium 95. The heat transferred to the cooling medium 95 then may be put useful work such as in the heat recovery steam generator 65, the steam turbine 70, and the like. The convective syngas cooler 90 generally is positioned perpendicularly to the radiant syngas cooler 85. As described above, plugging of the convective syngas cooler 90 by the solids within the flow of the syngas 45 may require the shutdown of the overall IGCC power plant 10. Other components and other configurations also may be used.

Figure 3:
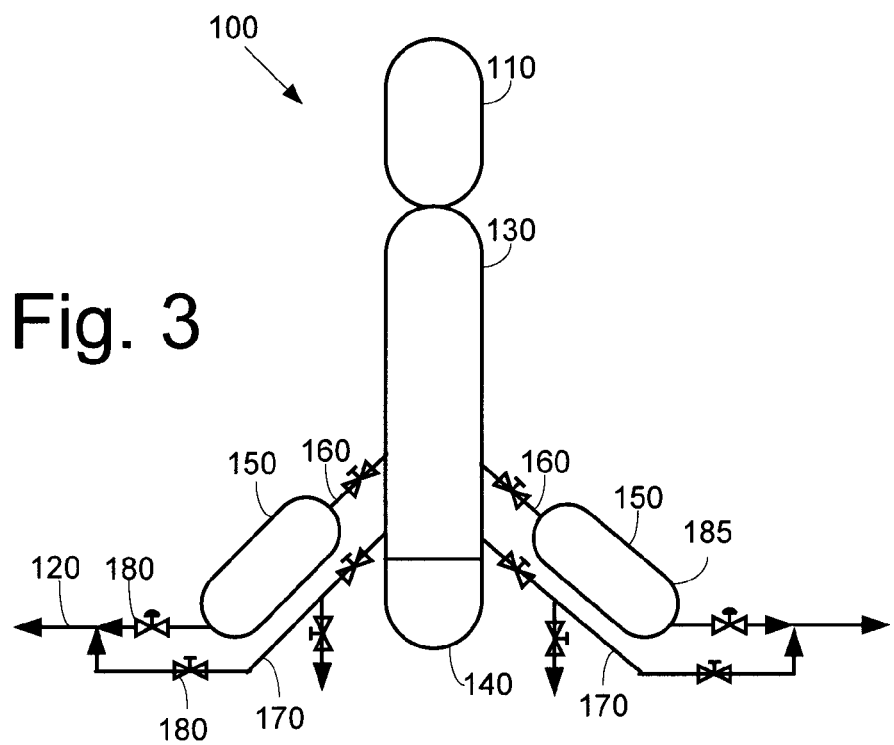
FIG. 3 shows a schematic diagram of a gasifier cooling system as may be described herein with a radiant syngas cooler, a quench chamber, and a number of convective syngas coolers.

FIG. 3 shows a schematic diagram of a gasifier cooling system 100 as may be described herein. The gasifier cooling system 100 may be used in the IGCC power plant 10 or elsewhere. The gasifier cooling system 100 includes a gasifier 110. The gasifier 110 converts any type of feedstock material into a flow of syngas 120 in any manner as was described above and the like. Any type of gasifier 110 may be used herein with any type of syngas conversion process. Multiple gasifiers 110 also may be used herein.

The gasifier cooling system 100 also may include a radiant syngas cooler 130 for receiving the flow of hot, dirty syngas 120 from the gasifier 110. As will be described in more detail below, the radiant syngas cooler 130 may include a quench chamber 140. Any type of radiant syngas cooler 130 and any type of quench chamber 140 may be used herein in any size, shape, or configuration. The gasifier cooling system 100 also may include one or more convective syngas coolers 150. Any type of convective syngas coolers 150 may be used herein in any size, shape, or configuration. The convective syngas cooler 150 may be connected to the radiant syngas cooler 130 via a convective syngas cooler conduit 160. Likewise, one or more quench conduit 170 may be used herein. The conduits 160, 170 may include a number of vents 180 thereon. The convective syngas cooler 150 may be at an inclined position 185 because of the use of the quench chamber 140. Other components and other configurations also may be used herein.

Figure 4:
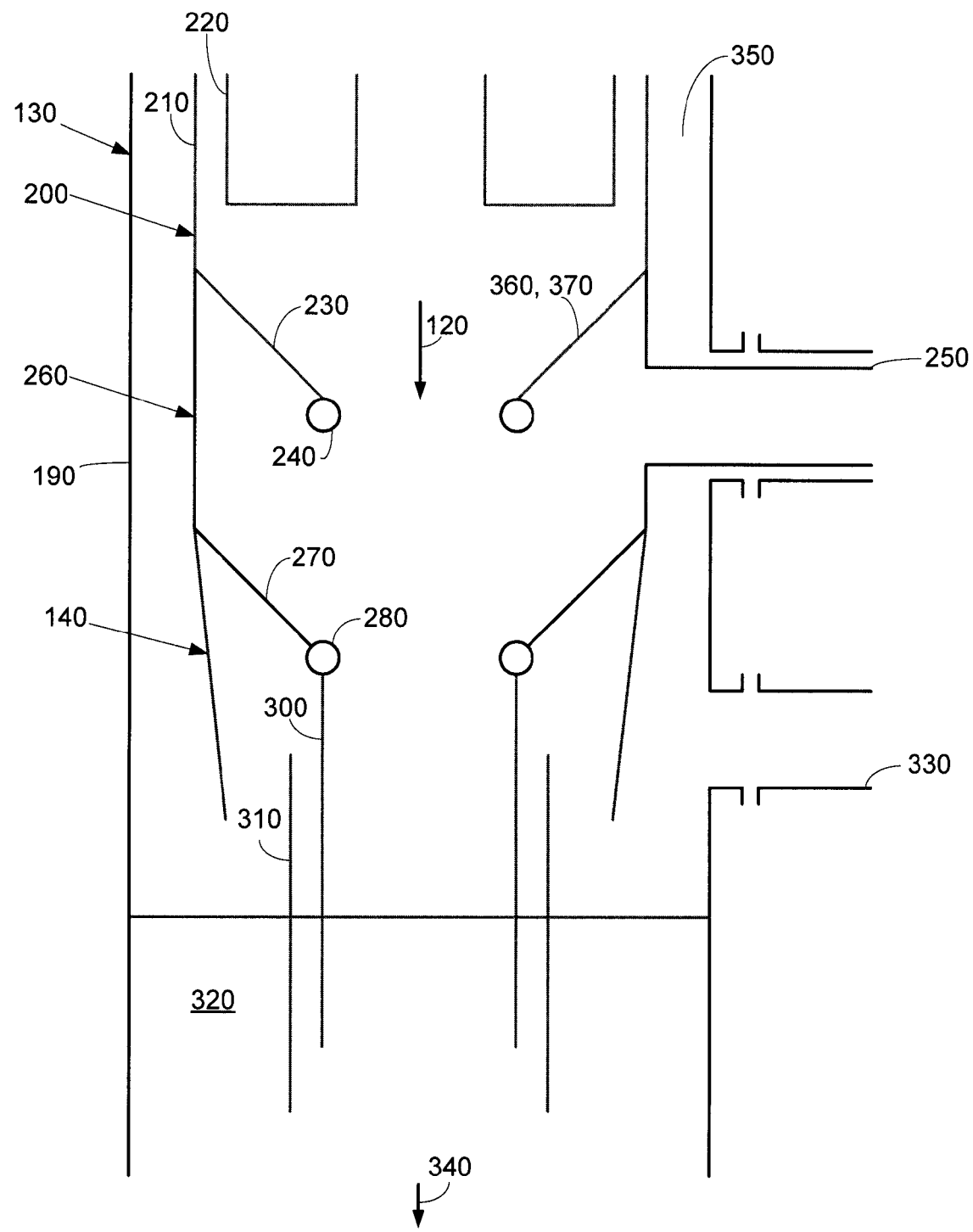
FIG. 4 is a schematic diagram a portion of the radiant syngas cooler as may be used with the gasifier cooling system of FIG. 3.

FIG. 4 shows a schematic diagram of an example of a bottom portion of the radiant syngas cooler 130. Generally described, the radiant syngas cooler 130 includes an outer casing 190. The radiant syngas cooler 130 further includes a heat transfer section 200. The heat transfer section 200 receives the flow of the syngas 120 from the gasifier 110. The heat transfer section 200 may include a platen and tube cage 210 with a number of platens 220 shown. The platens 220 may exchange heat with the flow of the syngas 120. A first converging cone 230 may be positioned at the bottom of the heat transfer section 200. The first converging cone 230 prevents non-uniformed gas flow distribution in the heat transfer section 200. A header 240 may surround the bottom of the first converging cone 230. A convection outlet 250 likewise may be positioned about the bottom of the first converging cone 230. The convection outlet 250 may extend through the casing 190 and may be in communication with the convective syngas cooler conduit 160. Other components and other configurations may be used herein.

A transition section 260 may extend underneath the heat transfer section 200. The transition section 260 may be defined by the first converging cone 230 and the convection outlet 250. The transition section 260 may be cooled using the same cooling medium as the heat transfer section 200. Alternatively, a separate cooling medium also may be used. The transition section 260 may continue into a second converging cone or a quench cone 270. A quench ring 280 may extend about the bottom of the quench cone 270. The quench ring 280 may be a substantially circular water distribution channel. Other components and other configurations may be used herein.

The quench chamber 140 may be positioned underneath the transition section 260. The quench chamber 140 may include a dip tube 300 surrounded by a draft tube 310 and positioned within a water bath 320. The dip tube 300 may be submerged within the water bath 320 while the outer draft tube 310 forms a concentric annulus. A quench outlet 330 may be positioned about the draft tube 310. The quench outlet 330 may be in communication with the quench conduit 170. A slag discharge 340 may be positioned beneath the quench chamber 140. Other components and other configurations may be used herein.

An outer annulus 350 may be positioned between the casing 190 and the tube cage 210. A number of seals also may be used herein to prevent entry of the flow of syngas 120. The flow surfaces 360 in contact with the flow of syngas 120 may include a refractory material insulation 370 to protect the surfaces from the heat herein. Other components and other configurations may be used herein.

In use, the flow of the hot, dirty syngas 120 from the gasifier 110 enters the radiant syngas cooler 130 about the heat transfer section 200. The syngas 120 is cooled via interaction with the platens 220 and flows through the first converging cone 230 and out via the convection outlet 250 towards the convective syngas cooler conduit 160 and the convective syngas cooler 150. The flow of syngas 120 then may be further cooled within the convective syngas cooler 150 via heat transfer with a cooling medium 90 as described above. This operation is known as a convection mode. In this convection mode, the quench outlet 330 may be shut. The quench ring 280 may spread a water film onto the dip tube 300 for cooling. The slag from the flow of syngas 120 continues through the transition section 260 and the quench chamber 140 to the slag discharge 340.

When plugging of the convective syngas cooler 150 is detected, the gasifier cooling system 100 may switch to a quench mode. Detection may be based upon the flow rate or the pressure of the syngas 120 or any other parameter. Conventional sensors and the like may be used herein. In the quench mode, the quench outlet 330 may be opened while the convection outlet 250 is closed. During a transition period between modes, the syngas 120 may be vented to the atmosphere. The water flow rate may be increased through the quench ring 280 to make up for the increased amount of evaporation and the required cooling of the components in the quench chamber 140 during quench mode. The flow of syngas 120 flows into the dip tube 300 and may be cooled within the water bath 320. The flow of syngas 120 then reverses direction through the draft tube 310 and may exit about the quench outlet 330. The quench conduit 170 thus bypasses the convective syngas cooler 150. The quench conduit 170 and the convective syngas cooler conduit 160 may merge downstream of the convective syngas cooler 150. In either mode, the outer annulus 350 may be continuous purged with nitrogen so as to prevent syngas from entering therein. The gasifier cooling system 100 may return to convection mode once the plugging has been corrected.

The gasifier cooling system 100 described herein thus avoids the overall plant downtime generally associated with the use of only convective syngas coolers. Likewise, by continuing the use of the convective syngas coolers when possible, the heat and steam generated therein may be put to useful work so as to maintain overall plant performance at a high level. Moreover, the size of the radiant syngas cooler 130 used herein may be relatively smaller in that the convective syngas coolers 150 may accommodate more of the heat from the flow of syngas 120.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A gasifier cooling system for cooling a flow of hot syngas from a gasifier, comprising:
   a radiant syngas cooler configured to receive the flow of hot syngas from the gasifier;
   a quench chamber in fluid communication with the radiant syngas cooler; and
   a convective syngas cooler in fluid communication with the radiant syngas cooler such that the flow of syngas flows through the convective syngas cooler, wherein the convective syngas cooler is positioned at a decline with respect to the radiant syngas cooler and is configured to cool hot syngas with a cooling medium.

2. The gasifier cooling system of claim 1, further comprising a plurality of convective syngas coolers.

3. The gasifier cooling system of claim 1, wherein the convective syngas cooler is in communication with the radiant syngas cooler via a convective syngas cooler conduit.

4. The gasifier cooling system of claim 1, wherein the radiant syngas cooler comprises a heat transfer section with a plurality of platens therein.

5. The gasifier cooling system of claim 4, wherein the radiant syngas cooler comprises a converging cone positioned underneath the plurality of platens.

6. The gasifier cooling system of claim 5, wherein the radiant syngas cooler comprises a convection outlet positioned about the converging cone.

7. The gasifier cooling system of claim 5, wherein the radiant syngas cooler comprises a header positioned about the converging cone.

8. The gasifier cooling system of claim 1, wherein the radiant syngas cooler comprises a transition section with a transition converging cone.

9. The gasifier cooling system of claim 8, wherein the radiant syngas cooler comprises a quench ring positioned about the transition converging cone.

10. The gasifier cooling system of claim 1, wherein the quench chamber comprises a dip tube, a draft tube, and a water bath.

11. The gasifier cooling system of claim 1, wherein the quench chamber comprises a quench outlet.

12. The gasifier cooling system of claim 1, wherein the quench outlet is in communication with a quench conduit.

13. The gasifier cooling system of claim 1, further comprising a slag discharge.

14. A gasifier cooling system for cooling a flow of hot syngas from a gasifier, comprising:
   a radiant syngas cooler configured to receive the flow of hot syngas from the gasifier;
   a quench chamber positioned about an in fluid communication with the radiant syngas cooler;
   one or more convective syngas coolers in fluid communication with the radiant syngas cooler, each positioned at a decline with respect to the radiant syngas cooler, the one or more convective syngas coolers configured to cool hot syngas with a cooling medium; and
   one or more convective syngas cooler conduits connecting the radiant syngas cooler and the one or more convective syngas coolers such that the flow of syngas flows through the quench chamber or the one or more convective syngas coolers.

15. The gasifier cooling system of claim 14, wherein the radiant syngas cooler comprises one or more convection outlets in communication with the one or more convective syngas cooler conduits.

16. The gasifier cooling system of claim 14, wherein the quench chamber comprises a quench outlet.

17. The gasifier cooling system of claim 16, wherein the quench outlet is in communication with a quench conduit.

* * * * *